(12) United States Patent
Green

(10) Patent No.: US 7,597,207 B2
(45) Date of Patent: Oct. 6, 2009

(54) COLLAPSIBLE CONTAINER

(76) Inventor: Shaun David Green, 9 Earl Mountbatten Drive, Billericay, Essex (GB) CM12 0ED ( * ) Notice: Subject to any disclaimer, the term of this patent is extended or adjusted under 35 U.S.C. 154(b) by 367 days.

(21) Appl. No.: 10/587,232

(22) PCT Filed: Jan. 24, 2005

(86) PCT No.: PCT/GB2005/000247

§ 371 (c)(1),
(2), (4) Date: Jul. 24, 2006

(87) PCT Pub. No.: WO2005/070775

PCT Pub. Date: Aug. 4, 2005

(65) Prior Publication Data

US 2007/0157534 A1 Jul. 12, 2007

(30) Foreign Application Priority Data

Jan. 24, 2004 (GB) .................................. 0401585.5

(51) Int. Cl.
*B65D 6/00* (2006.01)
*B65D 8/14* (2006.01)
*B65D 5/36* (2006.01)

(52) U.S. Cl. ....................... 220/6; 220/4.29; 229/117.05
(58) Field of Classification Search ................ 220/4.28, 220/4.29, 4.31, 6; 229/117.01, 117.05
See application file for complete search history.

(56) References Cited

U.S. PATENT DOCUMENTS

| 2,803,084 | A | * | 8/1957 | Frerking ........................ 43/55 |
| 4,828,132 | A | * | 5/1989 | Francis et al. .................. 220/6 |
| 6,640,944 | B2 | * | 11/2003 | Adams ....................... 190/110 |
| 2003/0080125 | A1 | | 5/2003 | Cassani | |

FOREIGN PATENT DOCUMENTS

| DE | 4207515 | 11/1992 |
| GB | 2384234 | 7/2003 |
| WO | WO 00/12393 | 3/2000 |

* cited by examiner

*Primary Examiner*—Harry A Grosso
(74) *Attorney, Agent, or Firm*—Andrus, Sceales, Starke & Sawall, LLP

(57) ABSTRACT

A collapsible goods container has a rectangular base panel (10) with two hinge lines (37,38) extending between the width edges (17,18), parallel to the length edges (15,16) and disposed in the central region of the base panel. A first side wall (11) is hinged to a first length edge (15) of the base panel, the height of the side wall being not greater than one half of the length of a width edge (17) of the base panel. A second side wall (12) is connected to the first side wall (11) by opposed pairs of end walls (13,14) hinged to the side walls, each end wall having a fold line (23) disposed substantially centrally between the first and second side walls and substantially parallel to the common edges of the respective end and side walls. Fasteners (44) are provided to connect together the base panel and the adjacent edge of the second side wall, when the container is fully erected. When the fasteners are released, the container may be collapsed by folding inwardly both end walls (13,14) to bring the first and second side walls (11,12) close together and then hinging the side walls down to overlie one part (40) of the base panel to one side of the hinge lines (37,38) therein. The other part (41) of the base panel to the other side of the hinge lines may then be folded to overlie the one part (40).

20 Claims, 4 Drawing Sheets

COLLAPSIBLE CONTAINER

CROSS-REFERENCE TO RELATED APPLICATIONS

This application is the U.S. national stage application of International Application PCT/GB2005/000247, filed 24 Jan. 2005, which international application was published on 4 Aug. 2005, as International Publication WO 2005/070775 in the English language. The International Application claims priority of Great Britain Patent Application 0401585.5, filed 24 Jan. 2004, This invention relates to a collapsible container for the carriage or storage of goods, and in particular though not exclusively to a collapsible container for use in a domestic environment or within a motor vehicle such as a car or estate vehicle.

The situation frequently arises where a person wishes to have a container for the transport or temporary storage of goods. To have a permanently erected container for such temporary storage is inconvenient, because the container takes up the same space, whether empty or loaded. This is particularly the case for a container for use in a motor vehicle, for instance positioned within the boot of the vehicle. Though the container may be highly convenient for the carriage of goods from a shop or supermarket, when the vehicle is being used for other purposes, then the presence of a rigid container within the boot may restrict the use of the boot for carrying other articles.

In an attempt to address this problem, collapsible storage containers are known. These may range from a simple cardboard box which may be stored collapsed but erected when required for use, to a crate which may be assembled from pre-moulded plastics panels. The former container tends to be relatively weak and unstable unless the overlying flaps are secured together, in which case the box cannot easily be collapsed again, whereas the latter is relatively expensive and can be difficult to erect.

The present invention aims at addressing the above problem, to provide a collapsible container suitable for the carriage or storage of goods, and which container is relatively easy to erect and collapse, as well as being relatively cheap to manufacture.

According to this invention, there is provided a collapsible container for the carriage or storage of goods, which container comprises:

a generally rectangular base panel defining pairs of orthogonal length and width edges and having at least one hinge line extending between the width edges substantially parallel to the length edges and disposed in the central region of the base panel to divide the base panel into two side areas;

a first side wall hinged to a first length edge of the base panel, the height of the side wall being not greater than one half of the length of a width edge of the base panel;

a second side wall connected to the first side wall by opposed pairs of end walls hinged to the side walls, each end wall having a fold line disposed substantially centrally between the first and second side walls and substantially parallel to the common edges of the respective end and side walls; and connection means provided on the base panel and adapted to connect together the base panel and the adjacent edge of the second side wall, when the container is fully erected;

wherein the container may be erected by unfolding the first side wall to upstand from the base panel and straightening the end walls so that the side walls are spaced apart and extend along opposed length edges of the base panel, and operating the connection means to hold the container erected; and the container may be collapsed by folding inwardly both end walls to bring the side walls close together, hinging the side walls down to overlie one side area of the base panel, and then folding the other side area of the base panel about the base panel hinge line to lie parallel to the one side area.

The collapsible container of this invention has been designed so as to be very easy to erect from a collapsed condition, or to collapse from an erected condition. Further, when collapsed the container is essentially planar (but having some thickness) and so takes up a minimum of space when stored, but when erected provides a relatively rigid structure which may be suitable for a variety of purposes but in particular for use in the boot or loading space of a motor vehicle, for the carriage of small items such as shopping from a supermarket.

In a preferred folding strategy, the other base panel is folded about the base panel hinge line to wrap around the side walls, the connection means then serving to secure the other side are substantially parallel to the one side area with the side and end walls disposed therebetween.

In order to allow the container to be collapsed to the smallest possible dimensions, it is important that the height of each side wall and each end wall is not greater than one half of the dimension of the base panel, in the direction of the width edges. Then, the side walls may be collapsed down to overlie each other with the end walls therebetween, and the overlying side and end walls may be folded down to overlie the side area of the base panel adjacent the hinge line of the first side wall to the base panel. Once done, the other side area of the base panel may be folded round to overlie folded-down side and end walls, and then the connection means operated to secure said other side area to the first side wall, substantially parallel to the one side area. When collapsed in this way, the folded-together side walls enclose the folded end walls and those side and end walls are enclosed between the two side areas of the base panel.

In order to facilitate folding as described above, preferably there is a pair of parallel hinge lines formed in a central region of the base panel whereby a central area is defined between the two side areas. Then, when the container is collapsed, that central area may extend substantially at right angles to the two side areas, to hold the two side areas spaced apart by a sufficient distance to accommodate the folded-together side and end walls. For such an arrangement, the height of the side and end walls should not be greater than the width direction of the side areas, to each side of the central area.

In addition, there may be formed in the base panel a further hinge line parallel to and spaced from the first length edge by a distance substantially equal to the thickness of the folded-together side and end walls. In this case, the height of the side and end walls must be reduced so as not to be greater than the distance between said further hinge line and the adjacent hinge line defining the central area of the base panel. For such an arrangement, the folded-together side and end walls are located between the overlying side areas, but with further areas of the base panel extending substantially at right angles to those side areas. One such further area is defined between the first length edge of the base panel and the further hinge line; and the other further area is the central area between the pair of parallel hinge lines in the central region of the base panel.

In an alternative folding strategy, the second side area of the base panel could be folded to lie immediately adjacent the first side area of the base panel, with the folded together side and end walls not being disposed between those side areas. However, such a folding strategy is not regarded as a preferred technique, since the side and end walls would not be constrained by the side areas of the base panel and so there may be a tendency for those walls to unfold themselves. This could perhaps be restrained by a suitable connection means but it is preferred for those walls to be enclosed between the side areas of the base panel.

In a preferred arrangement, the connection means comprises at least one releasable fastener having cooperating parts on the base panel at or adjacent the second length edge thereof and on the second side wall respectively. For example, such connection means may comprise one or more releasable press-fasteners, press-studs, or a two-part hook-and-loop fastener, such that the lower edge of the second side wall may be connected to the base panel by operating the fastener. The part of the fastener associated with the base panel may be on a tab or strip hinged to the second length edge of the base panel, such that the tab or strip may be folded up to lie alongside the lower edge of the second side wall. Then, the outside of the first side wall adjacent its hinge to the base panel may be provided with a further second part of the fastener, such that the tab or strip may be connected to that first side wall, thereby holding the container in its collapsed condition.

The end walls have lower edges which lie alongside the base panel when the container is erected for holding goods. At least one of those end walls, but preferably both, is provided with means to link together the respective lower edge to the base panel, thereby to assist holding the container erected. For example, such releasable linking means may comprise a tab projecting from the lower edge of the respective end wall and which is receivable in a corresponding slot formed in the base panel adjacent the associated width edge thereof.

A preferred embodiment of collapsible container of this invention has at least one internal transverse wall extending between the side walls partway along the lengths thereof, the or each transverse wall having a fold line similarly disposed to the fold lines of the end walls whereby the or each transverse wall may be folded during collapsing of the container. Each such transverse wall may have a hinge-strip adhesively bonded or otherwise secured to the side walls, in such a way as to permit relative pivoting movement therebetween. In addition, there may be an internal longitudinal wall which extends between the fold line of one end wall and the corresponding fold line of the or each transverse wall, with each transverse wall again hinged to that internal longitudinal wall. In this way, when erected, the container defines a plurality of individual compartments for receiving goods, but without affecting the folding characteristics to collapse or erect the container.

The container may be provided with a handle to assist the carrying thereof, when in its collapsed condition. Such a handle may fold out of the base panel of the container or could be permanently provided externally of the base panel, so as to be available for use when the container has been fully collapsed.

The container of this invention particularly lends itself to manufacture from plastics sheet materials which may be appropriately cut and scored to give the required profile and hinging characteristics. A particularly preferred material is a double-walled corrugated extruded sheet, which is relatively easy to cut to the required profile whilst being both strong and of low density.

By way of example only, one specific embodiment of collapsible container of this invention will now be described in detail, reference being made to the accompanying drawings in which.

Figure 1:
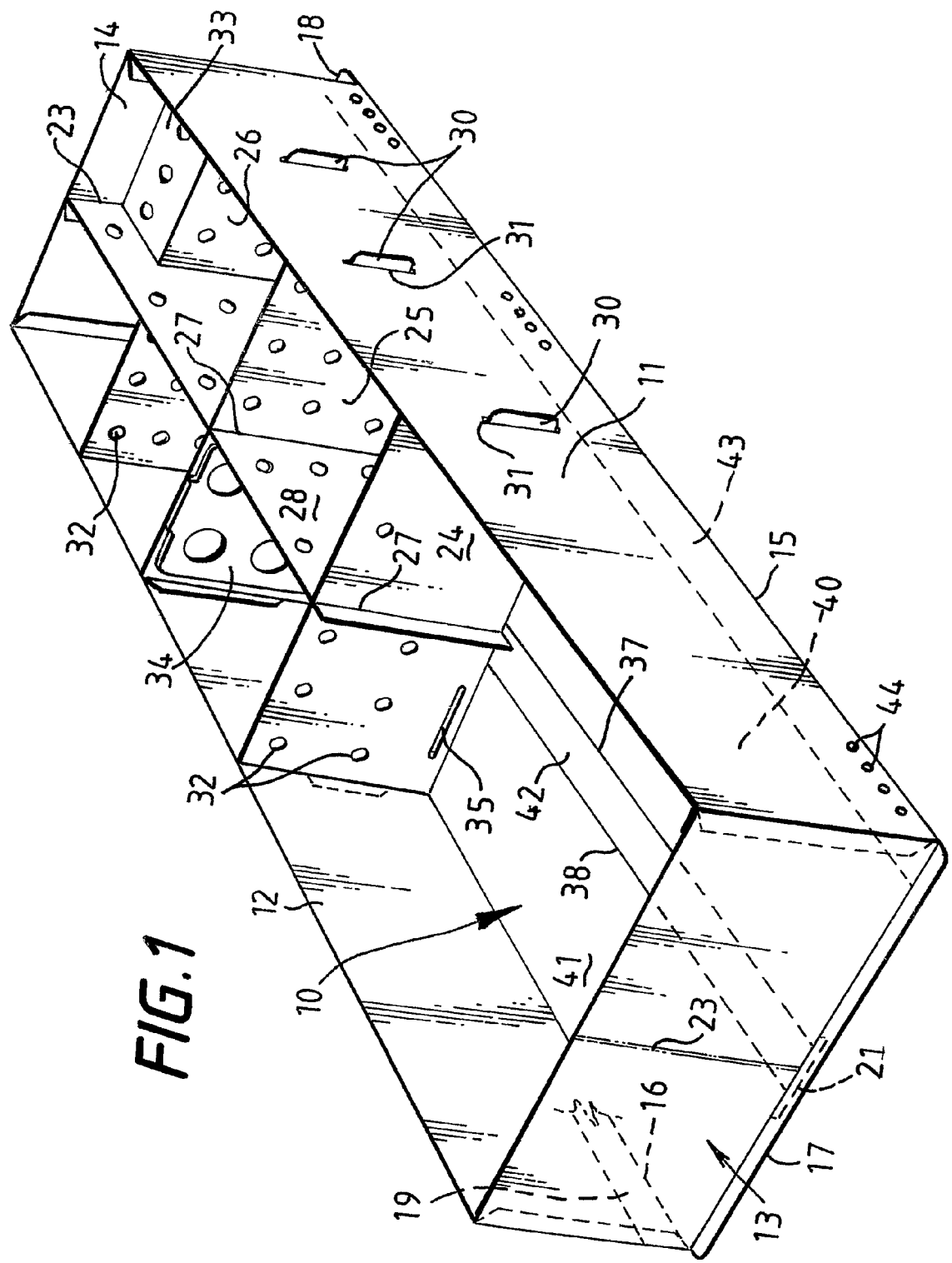
FIG. 1 is a perspective view of the embodiment of container, when fully erected and ready for use.

Referring to the drawings, there is shown an embodiment of container of this invention, both in its fully erected condition (FIG. 1) and in its fully collapsed condition (FIG. 4), as well as in two intermediate partly-collapsed stages. The container has a base panel 10, first and second side walls 11,12 and opposed end walls 13,14. The base panel 10 is of rectangular shape and is bound by orthogonal length and width edges 15,16 and 17,18, respectively. The first and second side walls 11,12 are also of rectangular shape and the lower edge of the first side wall is hinged to the length edge 15 of the base panel. Each of the first and second side walls 11,12 is of rectangular shape and has one edge hinged to the first side wall 11. The respective opposed edge of each of the first and second side walls 11,12 is hinged to the second side wall 12. Running along the length edge 16 of the base panel is a hinged strip 19 carrying one part of a two-part hook-and-loop fastener (such as that sold under the trade mark Velcro®), the lower edge of the second side wall 12 carrying the other part of that fastener, whereby the lower edge of the second side wall 12 may be secured to the length edge 16 of the base panel, by folding up the strip 19 and connecting together the two parts of the fastener. Instead of a hook-and-loop fastener, other fastenings could be used to secure the lower edge of the second side wall to the length edge 16 of the base panel—for example, several press-studs may be provided along the respective edges, or a tie arrangement.

Further, the central region of each end wall 13,14 has a downwardly-projecting tab 21 and the base panel has corresponding slots 22 formed therein, adjacent its width edges 17,18. When the container is in the fully erected condition shown in FIG. 1, the tabs 21 are received in the respective slots 22, further holding those side walls in the required position.

Figure 2:
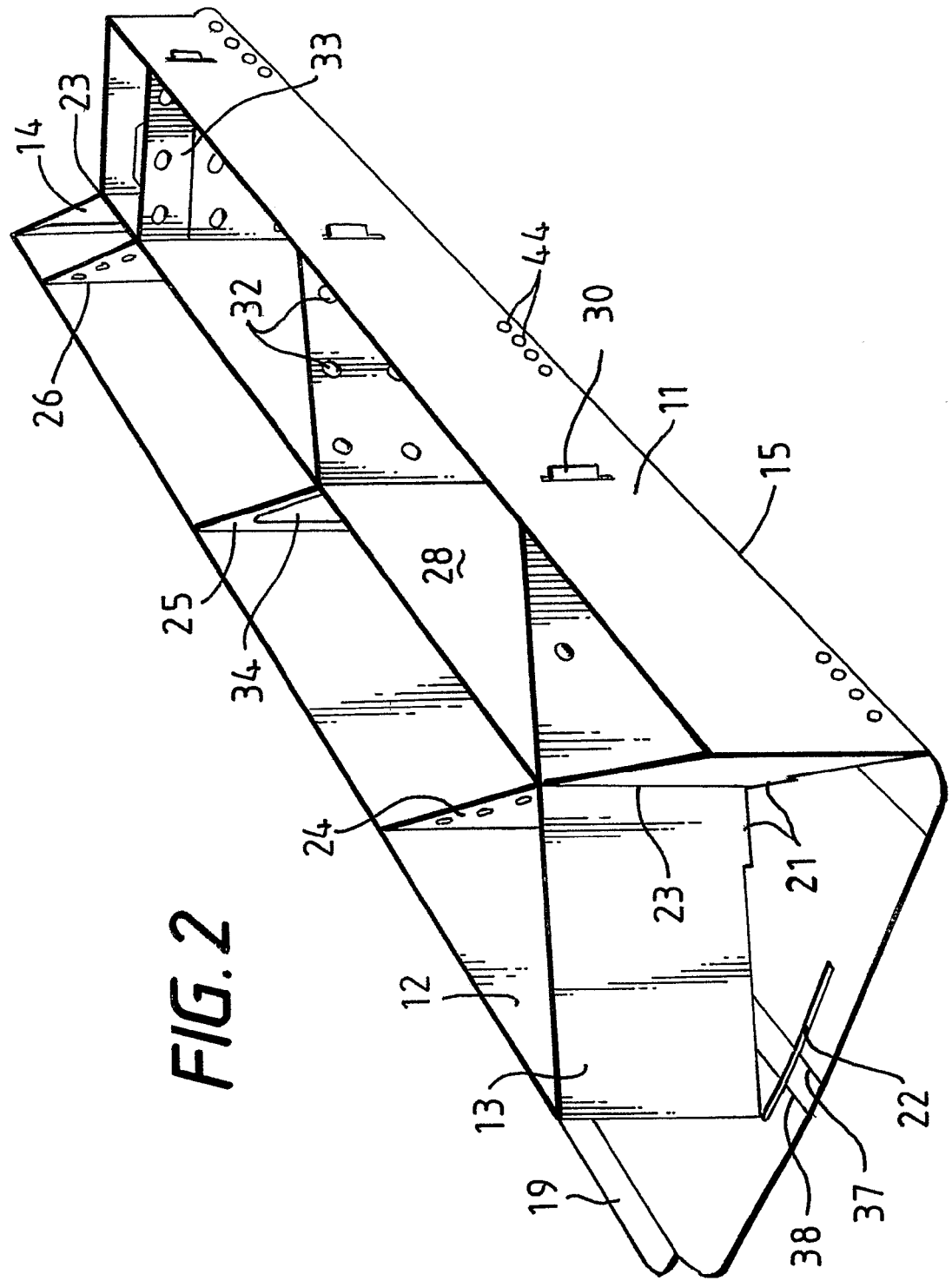
FIG. 2 shows the container of FIG. 1 but during a first stage of folding to collapse the container.

Each end wall 13,14 has a central hinge line 23, which permits the end wall to be folded inwardly during collapsing of the container, so bringing the second side wall 12 nearer to the first side wall 11, as shown in FIG. 2. This folding movement of the end walls may be continued until the first and second side walls are closely adjacent each other but with the folded end walls disposed therebetween.

Disposed within the container are internal transverse walls 24,25,26, each arranged in a generally similar manner to the end walls 13,14 and so each being hinged to the side walls 11,12 and also having a central hinge line 27. Further, there is a central longitudinal wall 28 extending from the hinge line 23 of end wall 14 to the hinge line 27 of internal transverse wall 24, through the hinge lines 27 of the internal transverse walls 25,26. That central longitudinal wall 28 thus extends parallel to the first and second side walls 11,12 and remains so during folding of the container, by all of the internal transverse walls being folded about their respective hinge lines together with the folding of the end walls.

As shown, the internal transverse walls 24 to 26 are hinged to the side walls 11,12 by means of projecting tabs 30 provided on the transverse walls and received in corresponding slots 31 formed in the side walls. Alternatively, those internal transverse walls could be provided with tabs folded through 90° and adhered or otherwise secured to the side walls. At least some of the internal transverse walls 24,25,26 and also the central longitudinal wall 28 may be perforated as shown at 32, in order to allow the circulation of air around the carried goods. Arrangements may be made to assist the carriage of various products. For instance, the upper part 33 of internal transverse wall 26 is provided with a flap, as shown in FIG. 1, which may be folded down when the container is fully erected, so as to provide a closed compartment. Further, transverse wall 25 may have a region 34 which may be folded down to lie parallel to the base panel, that region having relatively large holes through which the bases of bottles may be passed. That region 34 may include a projecting tab which is received in a slot 35 in the next adjacent transverse wall 26, to retain the region in its folded down position, parallel to the base panel 10.

Figure 3:
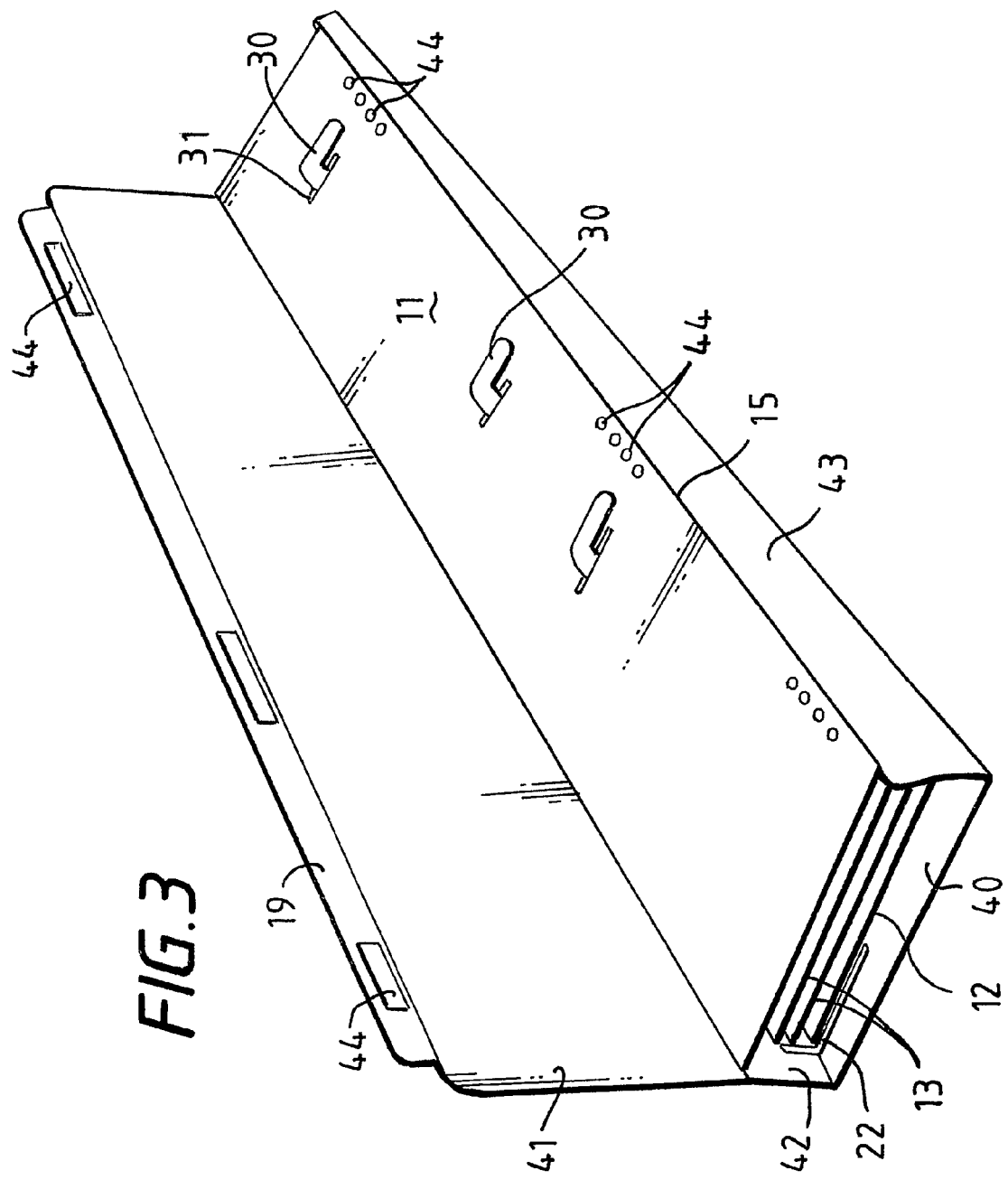
FIG. 3 shows the container of FIG. 1, but during a further stage of folding.

The base panel itself is divided by hinge lines 37 and 38 into two side areas 40,41 and a central area 42. The width of the central area 42 between hinge lines 37,38 and also the width of the marginal region 43 of side area 40 between hinge line 37 and first length edge 15, is substantially equal to the thickness of the folded-together first and second side walls 11 and 12, between which are disposed the folded end walls 13, folded internal transverse walls 24 to 26 and the internal longitudinal wall 28, as shown in FIG. 3. Further, the width of the side areas 40,41 of the base panel and measured in the direction of the width edges 17,18 is slightly greater than the height of the side walls 11,12 and the end and transverse walls 13,14, 24,25 and 26. This permits the container to be collapsed as will now be described.

From the fully erected position shown in FIG. 1, the container is collapsed by unfolding the upper part 33 of internal transverse wall 26, and the region 34 of internal transverse wall 25, so that those transverse walls are essentially planar. The tabs 21 of the end walls 13,14 are popped out of the slots 22 in the base panel and the hinged strip 19 is released from the lower edge of the second side wall 12, by separating the two parts of the hook-and-loop fastener. Then, the second side wall 12 is moved towards the first side wall 10, by folding the end walls 13,14 inwardly and also folding or allowing to fold the internal transverse walls 24,25,26 in a corresponding manner (FIG. 2). This is continued until the second side wall 12 is closely adjacent the first side wall 11 with the folded end walls 13,14, the folded internal transverse walls 24,25,26 and the central longitudinal wall 28 all disposed therebetween.

The marginal region 43 of the side area 40 is folded to lie at 90° to the major part of that side area 40 so that the second side wall 12 lies against the side area 40. Then, the side area 41 is folded around the above-mentioned side walls, end walls and internal walls such that the central area 42 lies parallel to the marginal region 43 (as shown in FIG. 3) whereafter the side area 41 of the base panel may be folded down on to the outside surface of the first side wall 11. The region of that first side wall 11 adjacent the marginal region 43 is provided with areas of the two part fastener, as shown at 44 in FIG. 3, such that the other part of the two part fastener on the hinged strip 19 may connect thereto. In this way, the side area 41 may be secured to the first side wall 11, to retain the container in its fully collapsed condition as shown in FIG. 4.

Figure 4:
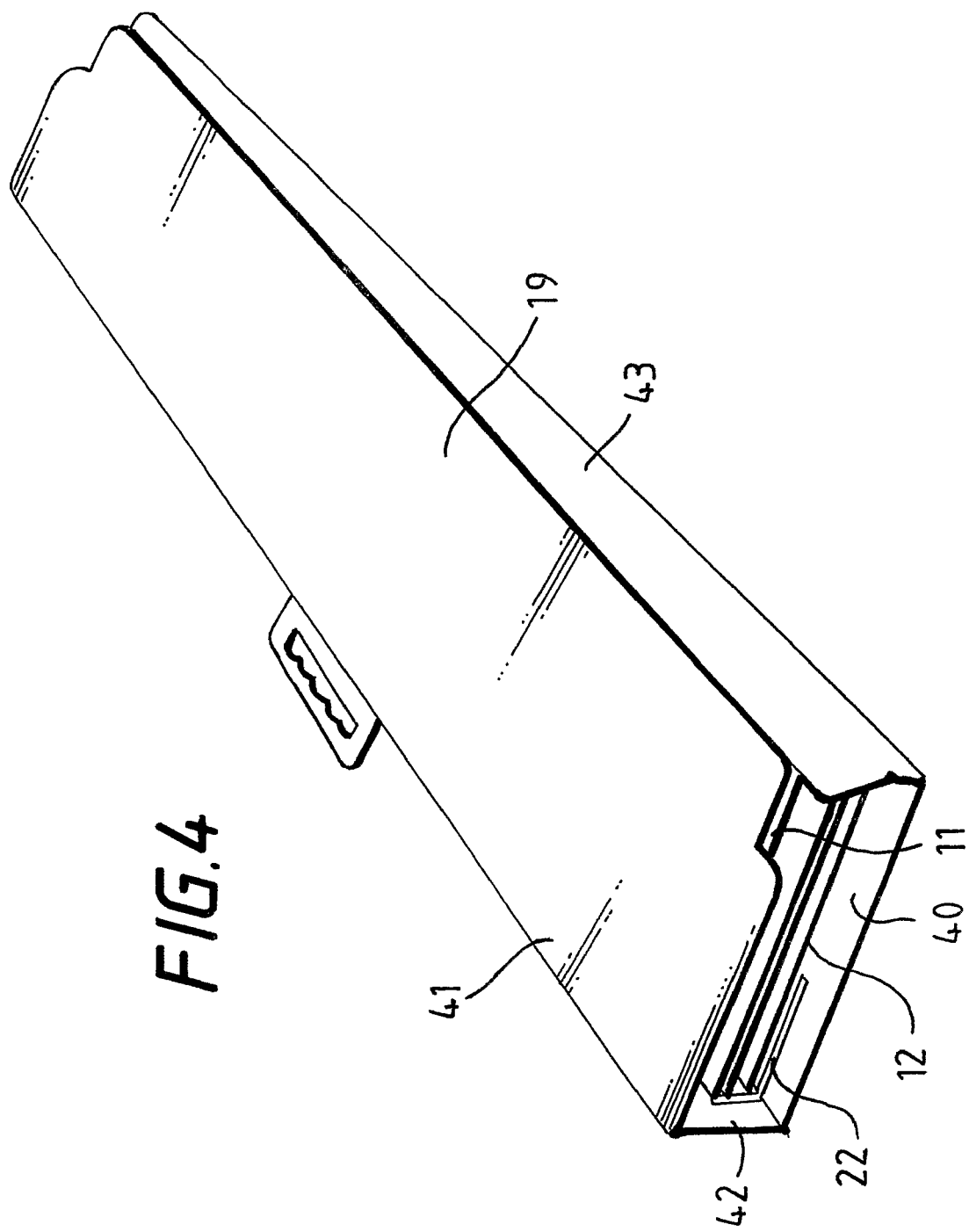
FIG. 4 shows the container of FIG. 1 when folded down and fully collapsed.

As shown in FIG. 4, the container when in its fully collapsed condition is in the form of a generally rectangular package. This much facilitates its storage when not required for use. When the container is to be used, it is a relatively simple matter to release the marginal region 43 from the side wall 11 and then open out the container by performing the reverse actions to those described above. The opened out container is then held in the condition shown in FIG. 1 by inserting the tabs 21 on the end walls 13,14 into the corresponding slots 22 and also connecting the two part fastener parts disposed respectively on the lower edge of the second side wall 12 and the hinged strip 19.

FIG. 4 also shows a simple handle which may be attached externally to the central area 42 of the base panel. When the container is erected, that handle will lie flat beneath the base panel and so not interfere with the use of the container.

The container described above advantageously is made of double-walled corrugated extruded sheet plastics material. Such material is easy to cut to the required shape and also to join together with adhesives where required, whilst displaying good strength with low density. Where hinge lines are to be formed, the material may partially be scored through, the region then being reinforced with a strip of self-adhesive tape.

Though not shown in the drawings, an insulated liner may be provided for one or more of the compartments of the container. Such a liner may have a base and four sides formed from an insulating material such as expanded polystyrene or a foamed polyurethane, the liner being dimensioned externally to be a snug fit within a compartment. An insulating liner of this kind may usefully be employed when the container as a whole is being used in the boot of a car, to assist the carriage of shopping from a store to a dwelling.

The invention claimed is:

1. A collapsible container for the carriage or storage of goods, which container comprises:
a generally rectangular base panel defining pairs of orthogonal length and width edges and having at least one hinge line extending between the width edges substantially parallel to the length edges and disposed in the central region of the base panel to divide the base panel into two side areas;
a first side wall hinged to a first length edge of the base panel, the height of the side wall being not greater than one half of the length of a width edge of the base panel;
a second side wall connected to the first side wall by opposed pairs of end walls hinged to the side walls, each end wall having a fold line disposed substantially centrally between the first and second side walls and substantially parallel to the common edges of the respective end and side walls; and
connection means provided on the base panel and adapted to connect together the base panel and the adjacent edge of the second side wall, when the container is fully erected;
wherein the container may be erected by unfolding the first side wall to upstand from the base panel and straightening the end walls so that the side walls are spaced apart and extend along opposed length edges of the base panel, and operating the connection means to hold the container erected; and the container may be collapsed by folding inwardly both end walls to bring the side walls close together, hinging the side walls down to overlie one side area of the base panel, and then folding the other side area of the base panel about the base panel hinge line to lie parallel to the one side area;
wherein there is formed in the base panel a further hinge line parallel to and spaced from the first length edge by a distance substantially equal to the thickness of the folded side and end walls.

2. A collapsible container as claimed in claim 1, wherein the end walls have lower edges which lie alongside the base panel when the container is erected for holding goods and at least one of said lower edges is provided with means to connect to the base panel, to hold the container erected.

3. A collapsible container as claimed in claim 2, wherein the lower edges of both end walls are provided with means to connect to the adjacent part of the base panel.

4. A collapsible container as claimed in claim 2, wherein said means to connect comprises a tab projecting from the lower edge of the respective end wall and which is receivable in a slot formed in the base panel adjacent the associated width edge thereof.

5. A collapsible container as claimed in claim 1, wherein there is provided an internal transverse wall extending between the side walls part-way along the lengths thereof, the transverse wall having a fold line similarly disposed to the fold lines of the end walls whereby the transverse wall is folded during collapsing of the container.

6. A collapsible container as claimed in claim 5, wherein there is provided an internal longitudinal wall which extends between the fold line of one end wall and the corresponding fold line of the transverse wall.

7. A collapsible container as claimed in claim 6, wherein there is provided at least one further transverse wall similar to said internal transverse wall and disposed between said transverse wall and the end wall.

8. A collapsible container as claimed in claim 5, wherein the or each transverse wall has a strip hinged to the ends thereof, which strips are adhesively bonded to the side walls.

9. A collapsible container as claimed in claim 5, wherein the or each transverse wall is hinged to the side walls by means of tabs provided on the end edges of the transverse walls engaging in slots formed through the side walls.

10. A collapsible container as claimed in claim 5, wherein the container is divided into separate compartments by the internal walls, the internal walls being configured to assist the storage of goods therein.

11. A collapsible container as claimed in claim 1, wherein there is provided a carrying handle projecting externally of the container from the base panel, part-way between the ends thereof.

12. A collapsible container as claimed in claim 1, wherein at least the base panel and the side and end walls are cut from plastics material sheet.

13. A collapsible container as claimed in claim 12, wherein the plastics sheet comprises a double-walled corrugated extrusion.

14. A collapsible container for the carriage or storage of good, which container comprises:
  a generally rectangular base panel defining pairs of orthogonal length and width edges and having at least one hinge line extending between the width edges substantially parallel to the length edges and disposed in the central region of the base panel to divide the base panel into two side areas;
  a first side wall hinged to a first length edge of the base panel, the height of the side wall being not greater than one half of the length of a width edge of the base panel;
  a second side wall connected to the first side wall by opposed pairs of end walls hinged to the side walls, each end wall having a fold line disposed substantially centrally between the first and second side walls and substantially parallel to the common on edges of the respective end and side walls;
  a pair of parallel hinge lines formed in the central region of the base panel whereby a central area is defined between the two side areas, the central area extending substantially at right angles to the two side areas when the container is collapsed, to hold the two side areas spaced apart; and
  connection means provided on the base panel and adapted to connect together the base panel and the adjacent edge of the second side wall. when the container is fully erected;
  wherein the container may be erected by unfolding the first side wall to upstand from the base panel and straightening the end walls so that the side walls are spaced apart and extend along opposed length edges of the base panel, and operating the connection means to hold the container erected; and the container may be collapsed by folding inwardly both end walls to bring the side walls close together, hinging the side walls down to overlie one side area of the base panel, and then folding the other side area of the bas panel about the base panel hinge line to lie parallel to the one side area.

15. A collapsible container as claimed in claim 14, wherein there is formed in the base panel a further hinge line parallel to and spaced from the first length edge by a distance substantially equal to the thickness of the folded side and end walls and the spacing between the pair of parallel hinge lines in the central region of the base panel is substantially equal to said distance by which the further hinge line is spaced from the first edge.

16. A collapsible container for the carriage or storage of goods, which container comprises:
  a generally rectangular base panel defining pairs of orthogonal length and width edges and having at least one hinge line extending between the width edges substantially parallel to the length edges and disposed in the central region of the base panel to divide the base panel into two side areas;
  a first side wall hinged to a first length edge of the base panel, the height of the side wall being not greater than one half of the length of a width edge of the base panel;
  a second side wall connected to the first side wall by opposed pairs of end walls hinged to the side walls, each end wall having a fold line disposed substantially centrally between the first and second side walls and substantially parallel to the common edges of the respective end and side walls; and
  connection means provided on the base panel at or adjacent the second length edge thereof and adapted to co-operate with the marginal region of the first side wall adjacent the hinged connection thereof to the base panel;
  wherein the container may be erected by unfolding the first side wall to upstand from the bas panel and straightening the end walls so that the side walls are spaced apart and extend along opposed length edges of the base panel, and operating the connection means to hold the container erected; and the container may be collapsed by folding inwardly both end walls to bring the side walls close together, hinging the side walls down to overlie one side area of the bas panel, and then folding the other side area of the base panel about the base panel hinge line to lie parallel to the one side area.

17. A collapsible container as claimed in claim 16, wherein said connection means comprises one or more releasable press-fasteners or press-studs having co-perating parts on the base panel and the side wall, respectively.

18. A collapsible container as claimed in claim 16, wherein said connection means comprises a two part hook-and-loop fastener with one part thereof on the base panel and the other part thereof on the side wall.

19. A collapsible container as claimed in claim 16 wherein the connection means includes a strip hinged to the second length edge of the base panel, one part of a two-part fastener being provided on the strip.

20. A collapsible container as claimed in claim 19, wherein the lower edge margin of the second side wall is provided with the other part of the fastener, whereby on erecting the container, the strip may be hinged upwardly to be connected to the lower edge of the second side wall.

* * * * *

UNITED STATES PATENT AND TRADEMARK OFFICE
CERTIFICATE OF CORRECTION

| | | |
|---|---|---|
| PATENT NO. | : 7,597,207 B2 | Page 1 of 1 |
| APPLICATION NO. | : 10/587232 | |
| DATED | : October 6, 2009 | |
| INVENTOR(S) | : Shaun David Green | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 441 days.

Signed and Sealed this

Twenty-eighth Day of September, 2010

David J. Kappos
*Director of the United States Patent and Trademark Office*